US009150264B2

(12) United States Patent
Monti et al.

(10) Patent No.: US 9,150,264 B2
(45) Date of Patent: Oct. 6, 2015

(54) MOTOR VEHICLE ASSEMBLY LINE

(75) Inventors: Denny Monti, Turin (IT); Giulio Talarico, Turin (IT); Marco Cavaglia, Turin (IT); Elio Tordella, Turin (IT)

(73) Assignee: Fiat Group Automobile S.p.A., Turin (IT)

( * ) Notice: Subject to any disclaimer, the term of this patent is extended or adjusted under 35 U.S.C. 154(b) by 62 days.

(21) Appl. No.: 14/125,915

(22) PCT Filed: Aug. 6, 2012

(86) PCT No.: PCT/IB2012/054011
§ 371 (c)(1),
(2), (4) Date: Mar. 20, 2014

(87) PCT Pub. No.: WO2013/018076
PCT Pub. Date: Feb. 7, 2013

(65) Prior Publication Data
US 2014/0197011 A1   Jul. 17, 2014

(30) Foreign Application Priority Data
Aug. 4, 2011  (EP) ..................................... 11425214

(51) Int. Cl.
*B62D 65/18* (2006.01)
*B65G 47/00* (2006.01)

(52) U.S. Cl.
CPC ..................................... *B62D 65/18* (2013.01)

(58) Field of Classification Search
None
See application file for complete search history.

(56) References Cited

U.S. PATENT DOCUMENTS

| 7,789,021 B2 * | 9/2010 | Nishihara et al. ............. 105/153 |
| 2004/0206605 A1 * | 10/2004 | Shibata et al. ............. 198/465.4 |
| 2007/0000758 A1 * | 1/2007 | Matsubara et al. ........ 198/465.4 |

FOREIGN PATENT DOCUMENTS

| DE | 100 54 366 A1 | 5/2002 |
| EP | 1 093 864 A2 | 4/2001 |
| JP | 52-43277 | 4/1977 |

* cited by examiner

Primary Examiner — Kavel Singh
(74) Attorney, Agent, or Firm — Dickstein Shapiro LLP

(57) ABSTRACT

An assembly line for motor vehicles in which a overhead guide supports a plurality of conveying units, each of which has a longitudinal axis, is provided with a supporting element for a respective body to be assembled, and is mobile in a given direction of advance through one or more rotation stations, in each of which an drive assembly, carried by the rotation station, is designed to engage a driven transmission assembly, carried by the conveying unit, for rotating the supporting element about the longitudinal axis.

8 Claims, 6 Drawing Sheets

MOTOR VEHICLE ASSEMBLY LINE

TECHNICAL SECTOR OF THE INVENTION

The present invention relates to an assembly line for motor vehicles, in particular road vehicles.

BACKGROUND ART

As is known, a motor-vehicle assembly line normally comprises a plurality of workstations aligned to, and set at a distance from, one another, a fixed conveying guide, which extends through the workstations in a given direction of advance, and a plurality of conveying units, each of which is designed to support a respective body and is mounted so as to slide along the conveying guide for displacing, with continuous or steplike motion, the body itself through the workstations.

In general, a conveying unit of a known type is defined by a gondola, which is suspended from a slide slidably coupled to the fixed guide and comprises an arched element designed to embrace laterally the body, and a supporting element, which is set at the free ends of the arched element and is designed so that it couples to the bottom panel of the body itself.

The suspension of the gondola from the slide is made in such a way as to enable the gondola to oscillate, with respect to the fixed guide, about an axis of its own parallel to the aforesaid direction of advance and to rotate the body between a normal plane position, where the bottom panel faces downwards and is substantially parallel to the floor, and a position rotated upwards, where the bottom panel is inclined, with respect to the floor, by a sufficiently wide angle, normally between 45° and 90° so as to enable operators to carry out work on the underbody conveniently.

To perform rotation of the gondola in given stages of the assembly process, it is known to provide, in the corresponding stretches of the assembly line, fixed deviator elements, each of which is shaped in such a way as to couple in succession to the arched elements and rotate each arched element by a respective pre-set angle. Each conveying unit is moreover provided with a blocking device designed to keep the respective arched element in the inclined position.

A solution of this type is known, for example, from JP 52002971 and JP 52043277. In particular, JP 52043277 discloses an arched hanger arm rotatably inserted between the two pairs of rotatable guide rollers which are rotatably supported by a suspension mechanism of an hanger body which is driven by a overhead conveyer 2. The hanger arm is provided on its outer peripheral edge with a chain extending therealong and is rotated by a rotation mechanism having a gear which engages with the chain. The rotation mechanism comprises a gear set mounted on the hanger body and comprising a first bevel gear coaxial to the gear which engages with the chain, a second bevel gear which engages with the first bevel gear, a spur gear coaxial to the second bevel gear, a rack which engages with the spur gear in parallel with the overhead conveyer and which is arranged so as to rotate the hanger arm, and a reversing rack which engages with the spur gear to thereby reverse the hanger arm. Thus, the hanger arm is rotated or returned in by the movement of the hanger body.

Even though widely used on account of its simplicity, such a solution suffers, however, from certain drawbacks that can be put down principally both to the fact that the deviator elements have relatively large overall dimensions, which obviously complicates the structure of the assembly line, and to the fact that the deviator elements, being fixed, do not enable substantial modifications of the assembly process, for example modification of the stages of the process in which the bodies must be rotated, without considerable interventions of reconfiguration of the assembly line.

A further drawback derives from the fact that the fixed deviator elements, being "passive" elements, are able to perform rotation of the arched elements only when the respective conveying units displace, engaging with the deviator elements themselves, and consequently prove barely usable in the cases where the assembly line does not advance with continuous motion.

To overcome the above drawbacks, a different solution has been proposed, which envisages providing "on board" each conveying unit an electric actuator capable of rotating the respective arched element independently in pre-set workstations.

An example of this solution is provided by the document No. U.S. Pat. No. 5,234,096.

Albeit effective, said solution presents the drawback of proving considerably burdensome both from the standpoint of its construction and from the economic standpoint.

DESCRIPTION OF THE INVENTION

The aim of the present invention is to provide a motor-vehicle assembly line that will be free—from the drawbacks described above.

According to the present invention a motor-vehicle assembly line is provided according to the annexed claims.

BRIEF DESCRIPTION OF THE DRAWINGS

The invention will now be described with reference to the annexed drawings, which illustrate a non-limiting example of embodiment thereof and in which.

PREFERRED EMBODIMENTS OF THE INVENTION

Figure 1:
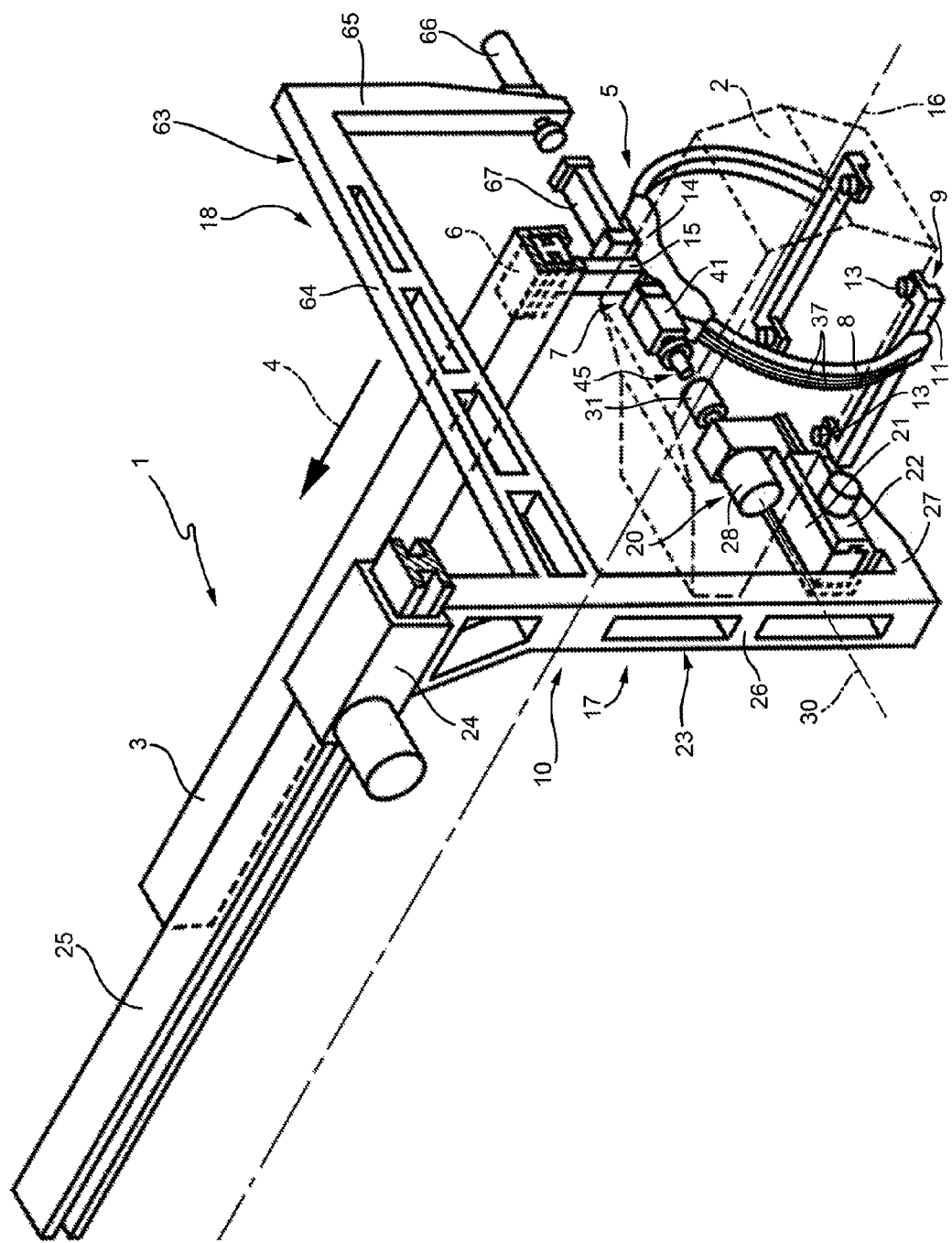
FIG. 1 is a schematic illustration, in partial perspective view and with parts removed for reasons of clarity, of a preferred embodiment of the assembly line according to the present invention.

Designated as a whole by 1 in FIG. 1 is a motor-vehicle assembly line, in the case in point an automobile assembly line.

The assembly line 1 comprises a plurality of workstations, which are aligned and set at a distance from one another along a path of advance of a succession of car bodies 2 to be assembled (of which just one is illustrated).

For displacing the bodies 2, the assembly line 1 is provided with a overhead fixed guide 3, which extends through the workstations in a substantially horizontal direction of advance 4, with a plurality of conveying units 5 (of which, just one is illustrated) slidably mounted along the fixed guide 3 and designed to support respective bodies 2, and with actuating means (known and not illustrated) designed to displace the conveying units 5 along the fixed guide 3 with continuous or steplike motion.

The fixed guide 3 is defined by a rectilinear sectional element with C-shaped cross section mounted at a given distance from the ground, and each conveying unit 5 comprises a overhead slide 6, slidably coupled to the fixed guide 3, and a gondola 7, which hangs from the slide 6 and in turn comprises an arched element 8 lying in a plane perpendicular to the direction of advance 4 and a supporting element 9 designed, in use, to be coupled rigidly to the bottom panel of a body 2 set through the arched element 8. In this way, the bodies 2 are able to advance with the respective gondolas 7 along a conveying channel 10 that extends, in the direction of advance 4, underneath the fixed guide 3 and through the workstations, and are raised from the ground by a distance such as to enable the operators to intervene conveniently on the bodies 2 in the workstations themselves.

Figure 4:
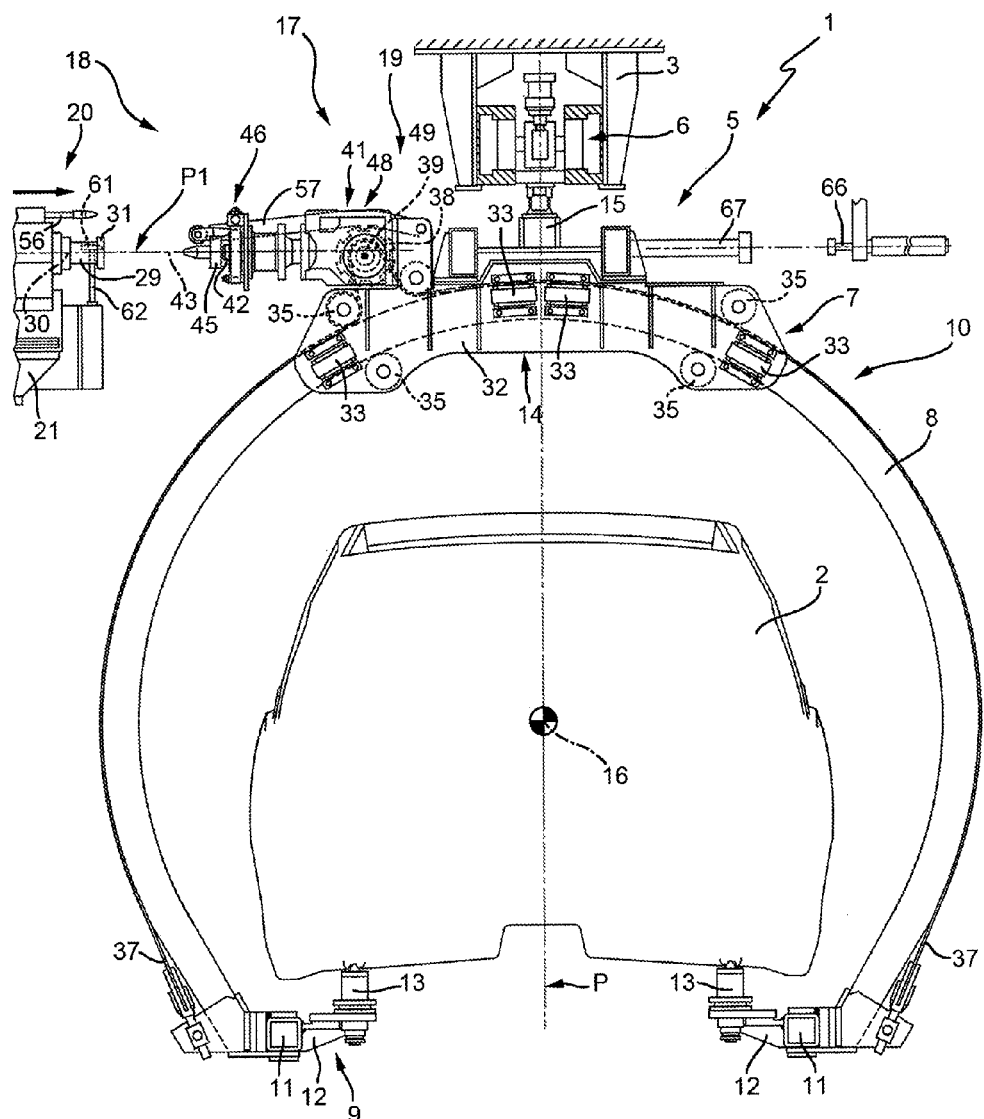
FIG. 4 is a view in front elevation and at an enlarged scale of a detail of FIG. 1.

According to what is illustrated in FIGS. 1 and 4, the supporting element 9 of each conveying unit 5 comprises a pair of longitudinal members 11, which are rigidly connected to respective free ends of the arched element 8, are parallel to the direction of advance 4, and are specular with respect to a plane of symmetry P (FIG. 4) of the arched element 8 itself, and each have, at their own axial ends, two brackets 12 projecting towards the plane of symmetry P and provided with respective feeler pins 13, designed to engage respective holes of the body 2 for blocking the body 2 itself on the longitudinal members 11.

The suspension of the arched element 8 from the slide 6 is obtained via a frame 14, which is rigidly connected to the slide 6 by means of a tie rod 15 and supports the arched element 8 so as to enable the latter to oscillate about an axis 16 passing through the centre of the arched element 8 and parallel to the direction of advance 4. In this way, a body 2 fixed on the supporting element 9 can be rotated between a normal plane position, where the respective bottom panel is substantially horizontal and faces the ground, and a position rotated upwards, where the bottom panel is inclined, with respect to the ground, by an angle preferably comprised between 45° and 90° and sufficient to enable an operator to carry out conveniently the work on the underbody.

The rotation of the arched elements 8 is made, in use, in given rotation stations 17 (just one of which is illustrated) and by means of a rotation unit 18 which comprises, for each conveying unit 5, a respective passive rotation assembly 19 carried by the conveying unit 5 itself, and, for each rotation station 17, a respective active drive assembly 20 designed to be coupled in succession to each rotation assembly 19 when the latter is set in the rotation station 17 itself to impart on the respective arched element 8 a rotation about the axis 16. All the rotation assemblies 19 are set, on the same side, on the respective conveying unit 5, and all the drive assemblies 20 face one and the same side of the channel 10 for conveying the bodies 2.

Figure 2:
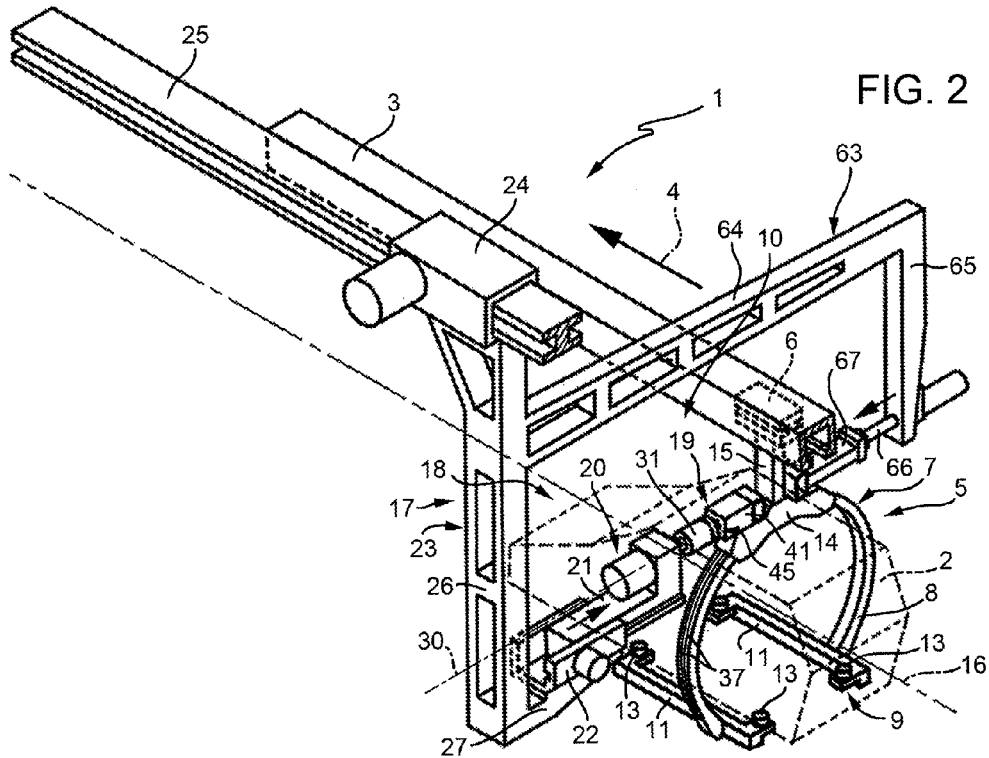
FIGS. 2 and 3 illustrate the assembly line of FIG. 1 in respective further operating configurations.
Figure 3:
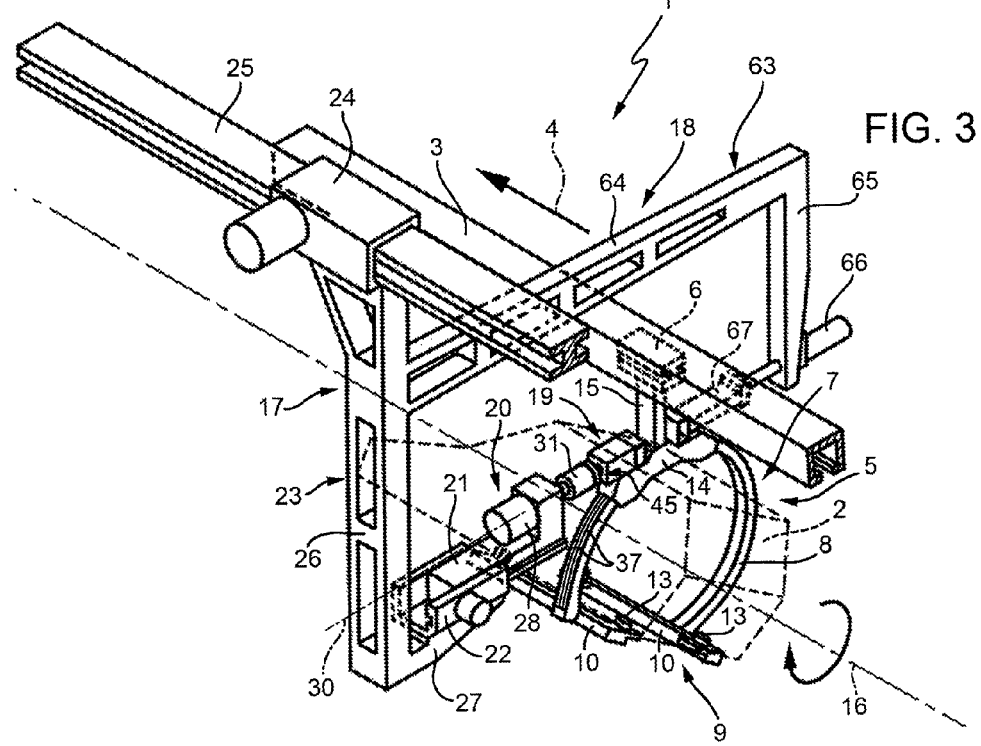

Illustrated in FIGS. 1, 2 and 3 is just one rotation assembly 19, associated to just the conveying unit 5 illustrated, and just one drive assembly 20, associated to just the rotation station 17 illustrated.

Each drive assembly 20 is set, in the respective rotation station 17, outside the channel 10 for conveying the bodies 2 and is carried by a motor-driven slide 21, which is slidably coupled to a rectilinear guide 22 for displacing, in use, the respective, drive assembly 20 in a direction substantially horizontal and transverse to the direction of advance 4, away from and towards an advanced position for coupling with the motor-reducer device 21 of the conveying unit 5 set, each time, in the rotation station 17.

Furthermore, to enable the respective drive assembly 20 to couple to the rotation assemblies 19 whilst the latter displace with continuous motion through the respective rotation station 17, each slide 21 is mounted in such a way as to enable the respective drive assembly 20 itself to displace alternatively, within the respective rotation station 17, in the direction of advance 4. For said purpose, according to what is illustrated in FIGS. 1, 2, and 3, each slide 21 is mounted on a carriage 23, which in turn comprises a motor-driven slide 24 slidably coupled to a fixed rectilinear guide 25, set at a level higher than the one occupied by the fixed guide 3 and parallel to the direction of advance 4. The carriage 23 further comprises a supporting arm 26, which is fixed with respect to the slide 24, extends from the slide 24 itself downwards and carries connected thereto, at its own bottom free end, a horizontal bracket 27, which projects towards the conveying channel 10 and supports the guide 22 of the slide 21.

Figure 5:
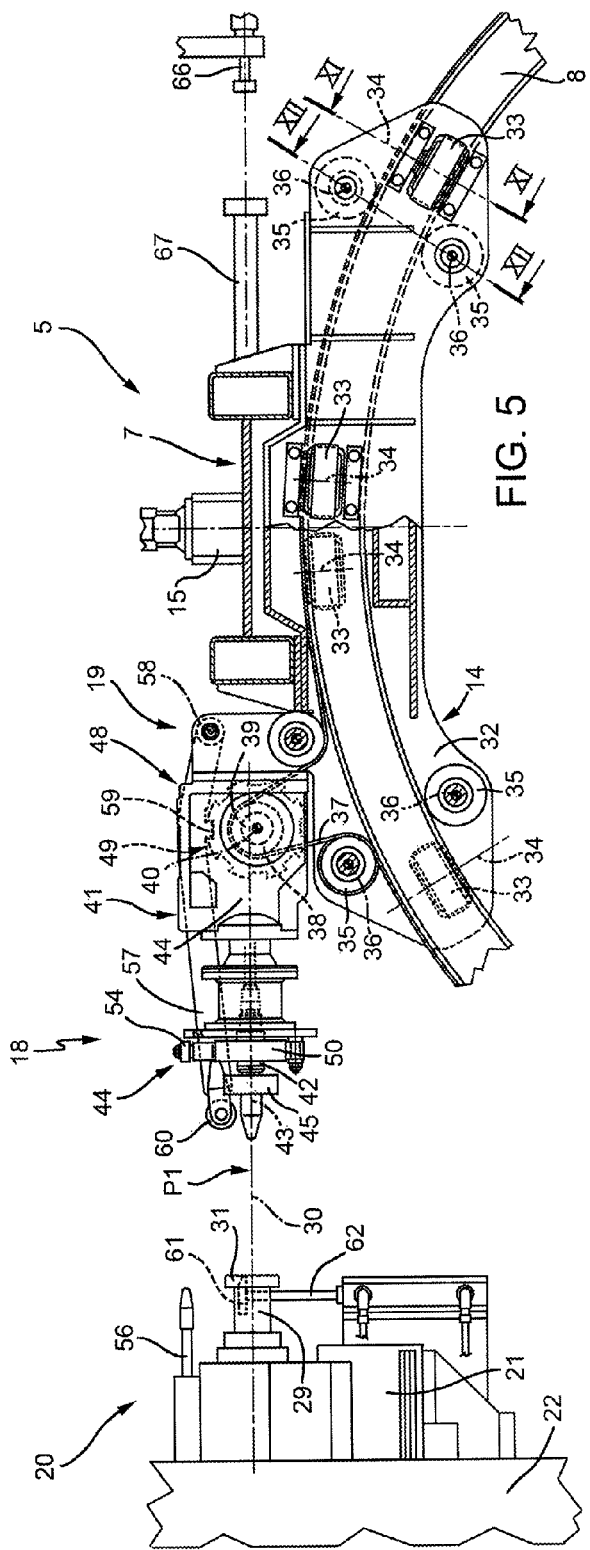
FIGS. 5 to 7 illustrate, at an enlarged scale and partially in cross section, a portion of the detail of FIG. 4 in respective operating configurations.

According to what is illustrated in FIG. 1 and, in greater detail, in FIGS. 4 and 5, each drive assembly 20 comprises an electric motor 28, an output shaft 29 of which extends towards the conveying channel 10 along a horizontal axis 30, transverse, to the direction of advance 4 and lying in a horizontal plane P1 set at a given level. The output shaft 29 carries connected thereto, at its own free end, a toothed front coupling 31.

With reference to FIGS. 4, 5, 11 and 12, the frame 14 comprises two plates 32, which are transverse to the direction of advance 4, are rigidly connected together by means of transverse stiffening plates and support a plurality of pairs of opposed rollers, which define, between the two plates 32, a channel with a curvilinear profile, which shares the axis 16 and is slidably engaged by a central portion of the arched element 8.

Figure 11:
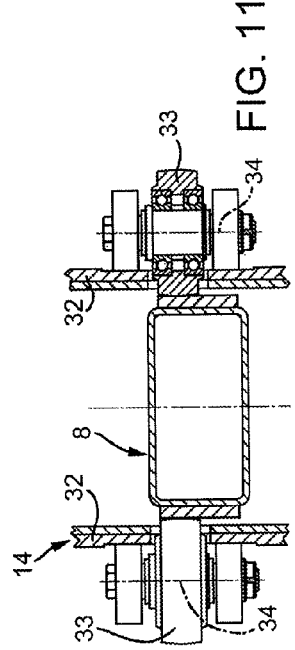
FIG. 11 is a cross section, according to the line XI-XI, of FIG. 5.

In particular, according to what is illustrated in FIGS. 5 and 11, the aforesaid rollers comprise a plurality of rollers 33, each of which is mounted on a respective plate for rotating idle about a respective axis 34 parallel to the plate 32 itself and transverse to the direction of advance 4, is opposed to an identical roller 33 mounted on the other plate 32, and extends partially through the respective plate 32 so as to slidably engage a respective side of the arched element 8.

Figure 12:
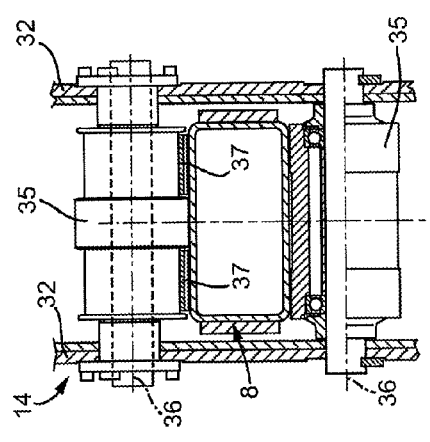
FIG. 12 is a cross section, according to the line XII-XII, of FIG. 5.

According to what is illustrated in FIGS. 5 and 12, the aforesaid rollers further comprise two pairs of rollers 35 set in the proximity of respective free ends of the frame 14. The rollers 35 of each pair are mounted through the plates 32 for rotating about respective axes 36 parallel to the direction of advance 4 and slidably engage an outer wall and, respectively, an inner wall of the arched element 8.

Figure 13:
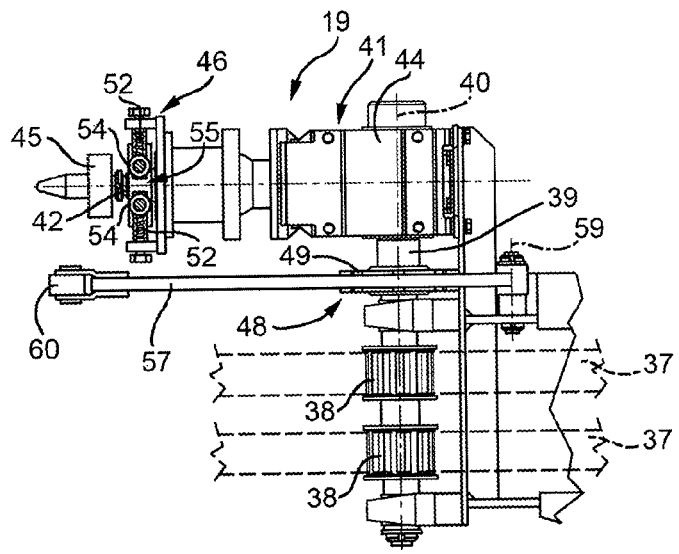
FIG. 13 is a plan view of a further detail of FIG. 5.
Figure 8:
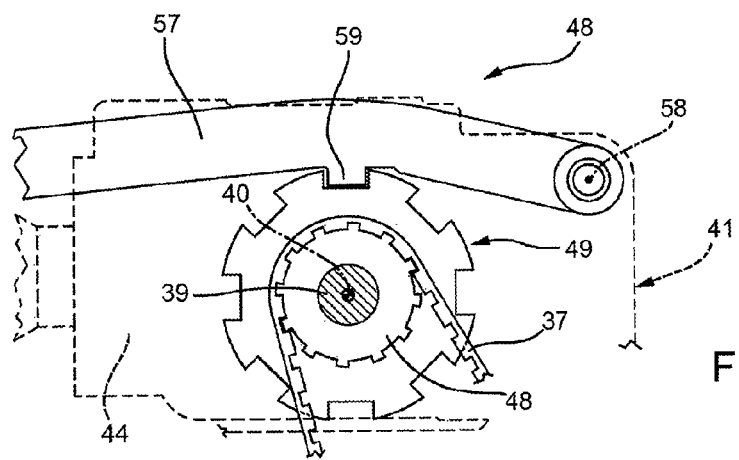

According to what is illustrated in FIGS. 4, 8 and 13, the arched element 8 is run over externally by two cogged belts 37, which form part of the rotation assembly 19 of the respective conveying unit 5 and are driven, in use, to cause the arched element 8 to oscillate about the axis 16. For this purpose, each belt 37 is anchored, at its ends, to respective free ends of the arched element 8, extends in contact with the outer surface of the arched element 8 itself, and comprises an intermediate portion, which is detached from the arched element 8 and is run over two return rollers, one of which is a roller 35, and over a respective toothed pulley 38 set between the return rollers and fitted on a shaft 39 for rotating about an axis 40 parallel to the direction of advance 4.

According to what is illustrated in FIGS. 5 and 13, the shaft 39 defines the output shaft of a motor-reducer device 41, which forms part of the rotation assembly 19 of the respective conveying unit 5 and is mounted on the frame 14 on the side facing the drive assemblies 20. The motor-reducer device 41 comprises an input shaft 42, which has an axis 43 transverse to the axis 40 and lying in the plane P1, and is kinematically connected to the shaft 39 via a series of gears (not illustrated) housed within a casing 44 rigidly connected to the frame 14. The shaft 42 carries connected thereto, at its own free end, a torque transmission toothed front coupling 45, designed to be coupled, in use, to the front coupling 31 of the shaft 29 when the respective drive assembly 20 is displaced in the aforesaid advanced coupling position.

In other worlds, shaft 29 is a torque takeoff and shaft 42 is an intake for the torque transmitted thereto by shaft 29 through torque transmitting coupling 31, 45.

According to what is illustrated in FIGS. 5 and 13, each rotation assembly 19 further comprises a jaw brake 46, which co-operates with a hub 47 carried by the shaft 42 for normally blocking the shaft 42 itself and, therewith, the belts 37, and a safety blocking device 48 designed to co-operate with a toothed ring nut 49 fitted on the shaft 39 for normally blocking the shaft 39 itself and, therewith, the pulleys 38 and the belts 37.

Figure 10:
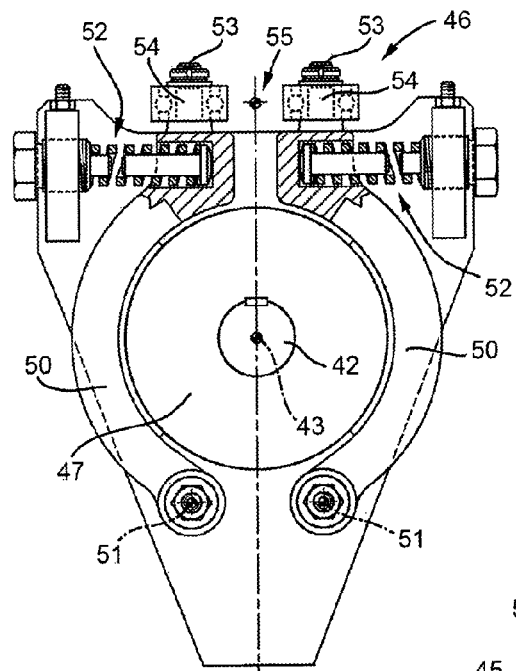
FIG. 10 illustrates in front view and partially in cross section the detail of FIG. 9.
Figure 9:
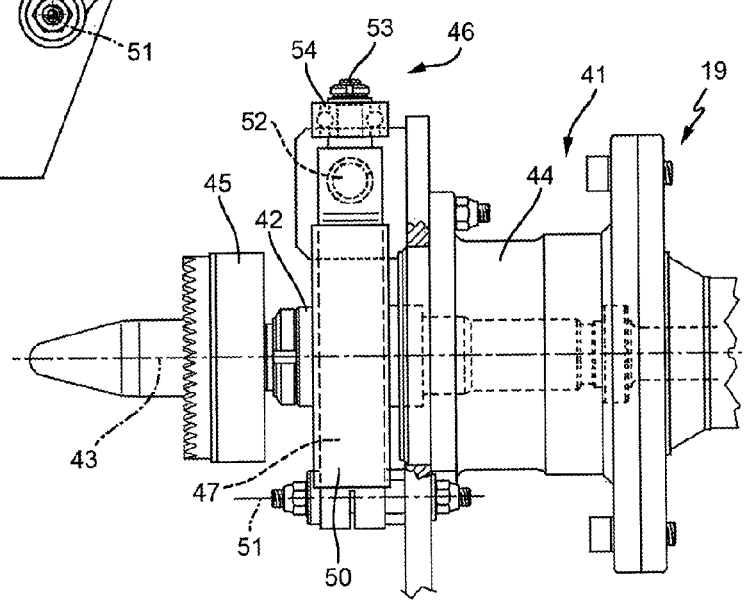
FIGS. 8 and 9 illustrate, at an enlarged scale, respective details of FIG. 5.

According to what is illustrated in FIGS. 9 and 10, the jaw brake 46 comprises a pair of jaws 50, which are pivoted on a plate fixed with respect to the casing 44 to oscillate about respective axes 51 set underneath the hub 47 and parallel to the axis 43, and are pushed towards the hub 47 by respective spring devices 52, each co-operating with the respective jaw 50 at the end thereof opposite to the one pivoted in 43. Projecting upwards from the ends of the jaws 50 adjacent to the spring devices 52 are two pins 53 carrying respective rollers 54, which define between them a channel 55 for insertion of an actuator member 56 designed to push the rollers 54 away from one another and detach the jaws 50 from the hub 47, enabling rotation thereof. The actuator member 56 is carried by the slide 21 above the plane P1 and is mobile, with respect to the slide 21 and under the thrust of a hydraulic actuator, away from and towards an extracted position of engagement of the channel 55.

According to what is illustrated in FIGS. 5, 8 and 13, the blocking device 48 comprises a lever 57, which is mounted on the casing 44 for rotating about an axis 58 parallel to the direction of advance 4 and extends towards the drive assemblies above the toothed ring nut 49. The lever 57 has an intermediate tooth 59 facing the toothed ring nut 49 and normally coupled to the toothed ring nut 49 itself, and is provided, at its own free end, with a tappet roller 60 that can turn, with respect to the lever 57, about an axis parallel to the axis 58. The tappet roller 60 is designed to co-operate with a cup 61, which is coupled to the slide 21 with interposition of a hydraulic actuator 62, designed to displace the cup 61 vertically away from and towards an operative raised position, where the cup 61 engages the tappet roller 60 for rotating the lever 57 about the axis 58 so as to disengage the tooth 59 from the toothed ring nut 49 and thus free the shaft 39.

According to what is illustrated in FIGS. 1 to 3, the carriage 23 comprises an L-shaped cross member 63, which is fixed with respect to the supporting arm 26 and comprises a horizontal portion 64 transverse to the direction of advance 4 and extending above the conveying channel 10, and a vertical portion 65, which is set on the side opposite to the supporting arm 26 with respect to the conveying channel 10 and carries connected thereto, at a free end of its own, a hydraulic pusher 66 sharing the axis 30 and being designed to co-operate, in the way and for the purposes that will be described in what follows, with a strut 67, carried by the frame 14 and set coaxial to the shaft 43.

Operation of the assembly line 1 will now be described in what follows, assuming, as first case, that the conveying units 5 have advanced along the conveying channel 10 and in the direction of advance 4 with continuous motion.

Operation will now be described starting from the operative configuration illustrated in FIG. 1, where a conveying unit 5 has entered a rotation station 17 and the respective gondola 7 is passing, with a respective body 2, in front of the carriage 23 associated to the rotation station 17 itself.

When the axis 43 of the shaft 42 of the motor-reducer device 41 is about to reach the position of alignment with the axis 30 of the shaft 29 of the motor 28, the slide 24 is driven for displacing the carriage 23, up to then stationary, in the direction of advance 4 in such a way that the shaft 29 is reached by the shaft 42, and then advances in unison with the shaft 42, remaining coaxial thereto (FIG. 5). Furthermore, according to what is illustrated in FIG. 5, in this operative condition, the jaw brake 46 is gripping on the shaft 29, the lever 57 is in a lowered position with the tooth 59 engaging with the toothed ring nut 49, the actuator member 56 is in an inoperative position, set back with respect to the front coupling 31, and, finally, the cup 61 is kept by the hydraulic actuator 62 in a lowered, inoperative, position.

Figure 6:
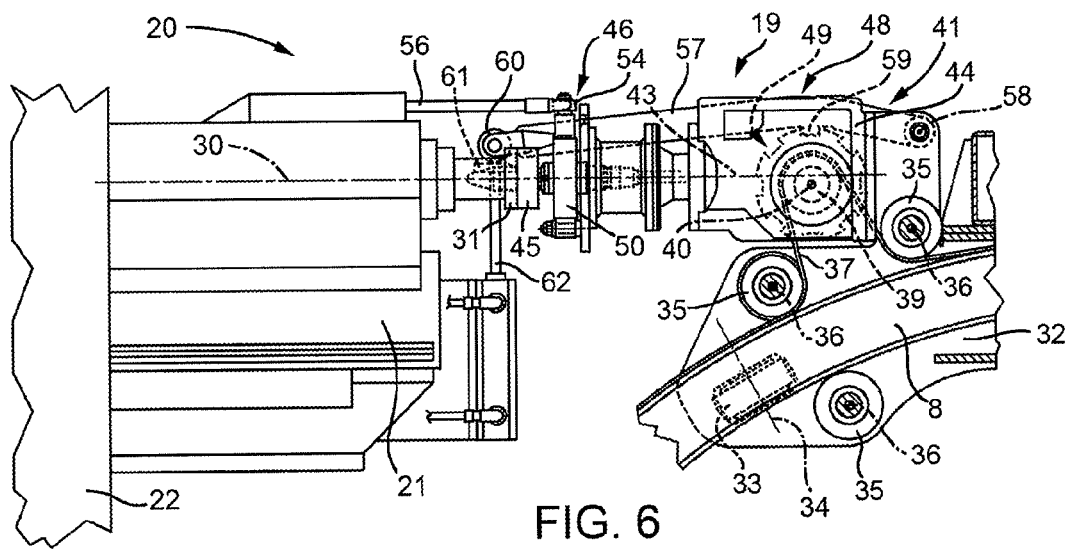
Figure 7:
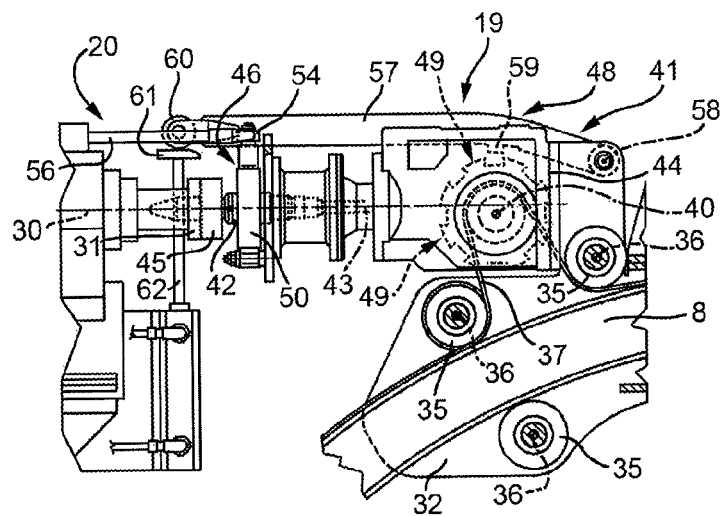

At this point, according to what is illustrated in FIGS. 2 and 6, the slide 21 that carries the drive assembly 20 is displaced towards the conveying channel 10 and towards the gondola 7 in such a way as to bring the front coupling 31 into coupling with the front coupling 45. Immediately after, the jaw brake 46 is released by displacement of the actuator member 56 into its aforesaid extracted position of engagement with the channel 55 (FIG. 6), with consequent detachment of the jaws 50 from the hub 47, and the blocking device 48 is deactivated by displacement of the cup 61 into the aforesaid raised, operative, position, with consequent disengagement of the tooth 59 from the toothed ring nut 49 (FIG. 7). Furthermore, in order to counterbalance the axial thrust imparted on the gondola 7 by the drive assembly 20, the hydraulic pusher 66 is advanced towards the gondola 7 and brought to bear upon the strut 67 (FIG. 2).

At this point, according to what is illustrated in FIG. 3, the motor 28 is driven to bring the shaft 29 into rotation and, along with it, the shaft 42, the shaft 39, and the pulleys 38 of the motor-reducer 41, with consequent actuation of the belts 37 and rotation of the arched element 8 and of the body 2 about the axis 16.

Detection of the angular position of the arched element 8 is made, preferably, via a recognition device of an optical type (not illustrated) comprising an encoded strip (of a known type), set on the arched element 8 between the two belts 37, and an optical reader carried by the carriage 23 and capable of "reading" the encoded strip for transmitting to an electronic control unit (not illustrated), which controls the motor 28, indications regarding the angular position of the arched element 8.

Once the arched element 8 has reached the pre-set inclination, the motor 28 is stopped, and the slide 21 is driven to move the drive assembly 20 away from the motor-reducer device 41. The regression of the slide 21 leads to immediate decoupling of the front coupling 31 from the front coupling 45 and, immediately after, disengagement of the actuator member 56 from the channel 55, with consequent return of the jaws 50 into the normal position of gripping on the hub and blocking of the shaft 42 under the thrust of the respective spring devices 52.

At the same time, moreover, the cup 61 slides underneath the tappet roller 60 until it disengages from the tappet roller 60 itself, leaving the lever 57 free to drop downwards and bring the tooth 59 to engage with the toothed ring nut 49, with consequent blocking of the shaft 39.

The jaw brake 46 and the blocking device 48 in this way guarantee that the arched element 8 maintains the inclination that has been imparted on it.

As soon as the conveying unit 5 is completely free, the slide 24 is stopped and immediately driven in the opposite direction to bring the carriage 23 back into the starting position, awaiting a next conveying unit 5.

In this connection, it should be pointed out that the alternating displacement of the slide 24 can be obtained, not only by using a motor-driven slide as in the example illustrated but also with different systems, for example, via a cam-drive system or a hydraulic actuator.

Operation of the assembly line 1 in the case where the conveying units 5 have advanced in a steplike fashion in the direction of advance 4 remains substantially the same as the case with continuous motion described above except for the fact that, in this case, the carriage 23 is always stationary and each conveying unit 5 is stopped in the rotation station 17 when the axis 43 is aligned to the axis 30 in such a way that the front coupling 45 can be engaged by the front coupling 31 following upon advance of the drive assembly 20 via the slide 21.

The invention claimed is:

1. A motor-vehicle assembly line (1) comprising:
an overhead guide (3);
a plurality of conveying units (5) each comprising an overhead slide (6) slidably coupled to the overhead guide (3), and supporting means (8, 9) coupled to the overhead slide (6) to support a respective motor-vehicle body (2) to be assembled, each conveying unit (5) being displaceable in a direction of advance (4) through one or more rotation stations (17) where the respective supporting means (8, 9) are mounted for rotation about a longitudinal axis (16) parallel to the direction of advance (4); and
rotation means (18) operable to rotate the supporting means (8, 9) of each conveying unit (5) about the respective longitudinal axis (16) at each rotation station (17);
the rotation means (18) comprising:
for each conveying unit (5), an overhead driven transmission assembly (19) comprising a torque intake (42) arranged to receive a torque from a direction transverse to the direction of advance (4) and coupled to the supporting means (8, 9) to responsively rotate the supporting means (8, 9) about the longitudinal axis (16); and
for each rotation station (17), an overhead torque supply (20) comprising a torque takeoff (29) configured to engage the torque intake (42) of a said driven transmission assembly (19) carried by a said conveying unit (5) in the rotation station (17) to responsively rotate the supporting means (8, 9) about the longitudinal axis (16);
wherein the torque intake (42) of each driven transmission assembly (19) comprises an input shaft (42) arranged transverse to the direction of advance (4) to receive a torque from said torque takeoff (29), and an output shaft (39) arranged parallel to the direction of advance (4) and coupled to the input shaft (42) to receive a torque therefrom; fast coupling means (31, 45) being provided between the torque takeoff (29) and the torque intake (42) to allow fast coupling therebetween; and the output shaft (39) being coupled to the supporting means (8, 9) of the respective conveying unit (5) to responsively rotate the supporting means (8, 9) about the respective longitudinal axis (16); wherein each conveying unit (5) further comprises a frame (14) hanging from the slide (6) and defining an inner channel coaxial to said longitudinal axis (16), said supporting means (8, 9) comprising an arched element (8) coaxial to said longitudinal axis (16) and slidably mounted within said channel.

2. The assembly line according to claim 1, wherein the conveying units (5) are movable with a steplike motion in the direction of advance (4) to stop, within each rotation station (17), in a given position in the direction of advance (4), each torque supply (20) being mounted in the respective rotation station (17) in said given position.

3. The assembly line according claim 1, wherein the conveying units (5) are movable with continuous motion in the direction of advance (4), each torque supply (20) being mounted for reciprocating within the respective rotation station (17) and parallel to the direction of advance (4) so as to move, in the direction of advance (4), simultaneously with each conveying unit (5) that moves through the rotation station (17).

4. The assembly line according to claim 1, wherein each torque supply (20) is mounted in the respective rotation station (17) to move transversely with respect to the direction of advance (4) away from and towards a coupling position with the driven transmission assembly (19) of the conveying unit (5) in the rotation station (17).

5. The assembly line according to claim 1, wherein the torque supply (20) comprises an electric motor (28) with an output shaft (29), which defines the respective torque takeoff, is arranged transverse to the direction of advance (4) and is designed to engage the input shaft (42) of the driven transmission assembly (19).

6. The assembly line according to claim 5, wherein releasable blocking means (48) are provided for angularly blocking one between said input shaft (42) and said output shaft (39), said blocking means (48) comprising a toothed ring nut (49) fitted on the shaft (42; 39) to be blocked, and an arrest tooth (59) mobile away from and towards a position of engagement with the toothed ring nut (49) under the thrust of first actuator means (61, 62).

7. The assembly line according to claim 1, wherein releasable brake means (46) are provided for angularly blocking one between said input shaft (42) and said output shaft (39), said brake means (46) comprising a pair of jaws (50), which are set on opposite sides of the shaft (42; 39) to be blocked and engage the shaft (42; 39) to be blocked itself under the thrust of elastic means (52), mobile wedge means (56) being provided for moving the jaws (50) away from one another against the thrust of said elastic means (52) and disengaging them from the shaft (42; 39) to be blocked.

8. The assembly line according to claim 1, wherein each driven transmission assembly (19) comprises a flexible transmission member (37), which extends along the arched element (8) and is anchored, at the two axial ends thereof, to respective free ends of the arched element (8), pulley means (38) being fitted on said output shaft (39) to engage an intermediate portion of the flexible member (37) and impart the arched element (8) a rotation about the respective longitudinal axis (16).

* * * * *